(12) United States Patent
Logan et al.

(10) Patent No.: US 11,162,616 B2
(45) Date of Patent: Nov. 2, 2021

(54) PASS-THROUGH BULKHEAD SEAL FITTING

(71) Applicant: THE BOEING COMPANY, Chicago, IL (US)

(72) Inventors: Chazz A. Logan, Manvel, TX (US); Ebrima A. Badjie, Daytona Beach, FL (US); Jon F. Housour, Champaign, IL (US)

(73) Assignee: THE BOEING COMPANY, Chicago, IL (US)

( * ) Notice: Subject to any disclaimer, the term of this patent is extended or adjusted under 35 U.S.C. 154(b) by 460 days.

(21) Appl. No.: 16/172,471

(22) Filed: Oct. 26, 2018

(65) Prior Publication Data

US 2019/0063640 A1   Feb. 28, 2019

Related U.S. Application Data

(63) Continuation of application No. 14/997,074, filed on Jan. 15, 2016, now Pat. No. 10,113,669.

(51) Int. Cl.
| | | |
|---|---|---|
| *F16L 5/08* | (2006.01) | |
| *B60R 16/02* | (2006.01) | |
| *H02G 15/00* | (2006.01) | |
| *B64D 1/00* | (2006.01) | |

(52) U.S. Cl.
CPC ............ *F16L 5/08* (2013.01); *B60R 16/0222* (2013.01); *B64D 1/00* (2013.01); *H02G 15/00* (2013.01); *B64D 2221/00* (2013.01)

(58) Field of Classification Search
CPC ........ H02G 15/00; H02G 15/013; H02G 3/33; F16L 5/08; F16L 5/06; F16L 5/02; F16L 5/12

See application file for complete search history.

(56) References Cited

U.S. PATENT DOCUMENTS

| 625,448 | A | * | 5/1899 | Jaenichen | ............. | F16L 55/172 |
| | | | | | | 138/99 |
| 2,784,385 | A | | 3/1957 | Ennis | | |
| 2,924,467 | A | | 2/1960 | Burch | | |

(Continued)

FOREIGN PATENT DOCUMENTS

| DE | 4322032 C1 | 6/1994 |
| DE | 19828838 A1 | 12/1999 |

(Continued)

OTHER PUBLICATIONS

Learn More About Cable Glands. Datasheet [online]. HIS engineering 360, 2016 [retrieved on Apr. 27, 2016]. Retrieved from the Internet: <URL: www.globalspec.com/learnmore/electrical_electronic_components/wires_cables/cable_glands.html>.

(Continued)

*Primary Examiner* — Hoa C Nguyen
*Assistant Examiner* — Amol H Patel
(74) *Attorney, Agent, or Firm* — Patterson + Sheridan, LLP

(57) ABSTRACT

Examples disclosed herein generally relate to a pass-through bulkhead seal fitting for use in the aircraft industry. In one example, a pass-through bulkhead seal fitting includes a male fitting comprising a tubular body that is separable to receive existing wiring, and a nut that is separable to receive existing wiring and being rotatable in a single direction relative to a longitudinal axis of the male fitting.

20 Claims, 8 Drawing Sheets

(56) References Cited

U.S. PATENT DOCUMENTS

| | | | |
|---|---|---|---|
| 3,031,212 A | 4/1962 | Oliver | |
| 3,104,120 A | 9/1963 | Ahlport | |
| 3,224,796 A * | 12/1965 | Burkitt | F16L 5/022 |
| | | | 285/149.1 |
| 3,448,896 A | 6/1969 | Sakuta | |
| 3,888,454 A | 6/1975 | Treadaway | |
| 4,059,324 A | 11/1977 | Snyder et al. | |
| 4,268,103 A | 5/1981 | Schildkraut et al. | |
| 4,359,254 A | 11/1982 | Gallusser et al. | |
| 4,431,198 A | 2/1984 | Beinhaur et al. | |
| 4,462,652 A | 7/1984 | Werth et al. | |
| 4,487,470 A | 12/1984 | Knapp et al. | |
| 4,500,154 A | 2/1985 | Collins | |
| 4,639,064 A | 1/1987 | Knapp et al. | |
| 4,749,251 A | 6/1988 | Moulin | |
| 5,277,459 A | 1/1994 | Braun et al. | |
| 5,406,032 A * | 4/1995 | Clayton | H02G 3/083 |
| | | | 174/151 |
| 5,739,468 A | 4/1998 | Rossman et al. | |
| 6,443,497 B1 | 9/2002 | Gravison | |
| 7,063,133 B2 | 6/2006 | Gordon et al. | |
| 7,479,023 B2 | 1/2009 | Czarnyszka | |
| 8,008,576 B2 | 8/2011 | Fuzetti | |
| 8,146,951 B2 | 4/2012 | Tung | |
| 8,777,534 B2 | 7/2014 | Wallbaum et al. | |
| 9,106,012 B2 * | 8/2015 | Gross, III | H01R 13/622 |
| 2002/0079697 A1 | 6/2002 | Griffioen et al. | |
| 2003/0063866 A1 | 4/2003 | Melton et al. | |
| 2006/0233496 A1 | 10/2006 | Khemakhem et al. | |
| 2008/0246276 A1 | 10/2008 | Bravo et al. | |
| 2015/0047508 A1 | 2/2015 | Sanocki et al. | |
| 2016/0180988 A1 | 6/2016 | Klein | |
| 2017/0205001 A1 | 7/2017 | Logan et al. | |

FOREIGN PATENT DOCUMENTS

| | | |
|---|---|---|
| DE | 202016002240 U1 | 6/2016 |
| EP | 1261094 A1 | 11/2002 |
| EP | 2650577 A2 | 10/2013 |
| WO | 2012041164 A1 | 4/2012 |
| WO | 2015047508 A1 | 4/2015 |

OTHER PUBLICATIONS

TBH-4 Through Bulkhead. Datasheet [online]. Scanstrut, 2016 [retrieved on Apr. 27, 2016]. Retrieved from the Internet: <URL: www.scanstrut.com/products/electrical-accessories/tbh-4-through-bulkhead-detail.HTML>.

TBH-10 Through Bulkhead. Datasheet [online]. Scanstrut, 2016 [retrieved on Apr. 27, 2016]. Retrieved from the Internet: <URL: www.scanstrut.com/products/electrical-accessories/tbh-10-through-bulkhead-detail.html>.

Extended European Search Report dated May 9, 2017 for Application No. 17151335.1-1809.

European Examination Report dated Feb. 12, 2018 for Application 17 151 335.1-1201.

Japanese Office Action for Application No. 20171004429 dated Jan. 19, 2021.

* cited by examiner

PASS-THROUGH BULKHEAD SEAL FITTING

CROSS-REFERENCE TO RELATED APPLICATIONS

The present disclosure is a continuation of U.S. application Ser. No. 14/997,074, filed Jan. 15, 2016. The entire contents of the foregoing applications are incorporated by reference into the present application.

BACKGROUND

The aircraft industry utilizes flight tests to acquire data to evaluate the aerodynamic flight characteristics of the vehicle and/or validate the design and capabilities of the vehicle. During these tests, wiring for testing the aircraft needs to be connected and disconnected through bulkheads and/or frames (e.g., a dividing wall or barrier between compartments in an aircraft, or other vehicle) using fittings that protect wiring as well as maintaining pressurization of the aircraft. The disconnection requires removal of a fitting from the bulkhead or frame, and the wiring. Connection requires installation of a fitting about the wiring and insertion into the bulkhead or frame. Conventional fittings require multiple spacers to account for differences in thickness of the bulkhead or frame, and a metal locking ring is utilized to lock the fitting in place. The typical fittings require specialized tooling for installation or disconnection, which is time consuming.

What is needed is a method and apparatus that simplifies the installation or disconnection process of a pass-through fitting.

SUMMARY

Examples disclosed herein generally relate to pass-through bulkhead seal fittings for use in the aircraft industry. In one example, a pass-through bulkhead seal fitting includes a male portion comprising a tubular body that is separable to receive existing wiring, and a nut that is separable to receive existing wiring and being rotatable in a single direction relative to a longitudinal axis of the male portion.

In another example, a pass-through bulkhead seal fitting includes a male portion comprising a tubular body and having a plurality of sealant exit ports formed in a radial direction relative to a longitudinal axis of the male portion through an inner surface of the body to an outer surface of the body, and a separable nut portion that is rotatable in a single direction relative to the longitudinal axis of the male portion.

In another example, a pass-through bulkhead seal fitting includes a male portion comprising a tubular multi-piece body, and a separable multi-piece nut that is rotatable in a first direction relative to the longitudinal axis of the male portion and having one or more detents formed thereon that prevents rotation of the nut in a second direction opposite to the first direction.

BRIEF DESCRIPTION OF THE DRAWINGS

So that the manner in which the above recited features of the present disclosure can be understood in detail, a more particular description of the disclosure, briefly summarized above, may be had by reference to examples, some of which are illustrated in the appended drawings. It is to be noted, however, that the appended drawings illustrate only typical examples of this disclosure and are therefore not to be considered limiting of its scope, for the disclosure may admit to other equally effective examples.

To facilitate understanding, common words have been used, where possible, to designate identical elements that are common to the figures. It is contemplated that elements disclosed in one example may be beneficially utilized on other examples without specific recitation.

DETAILED DESCRIPTION

Figure 1:
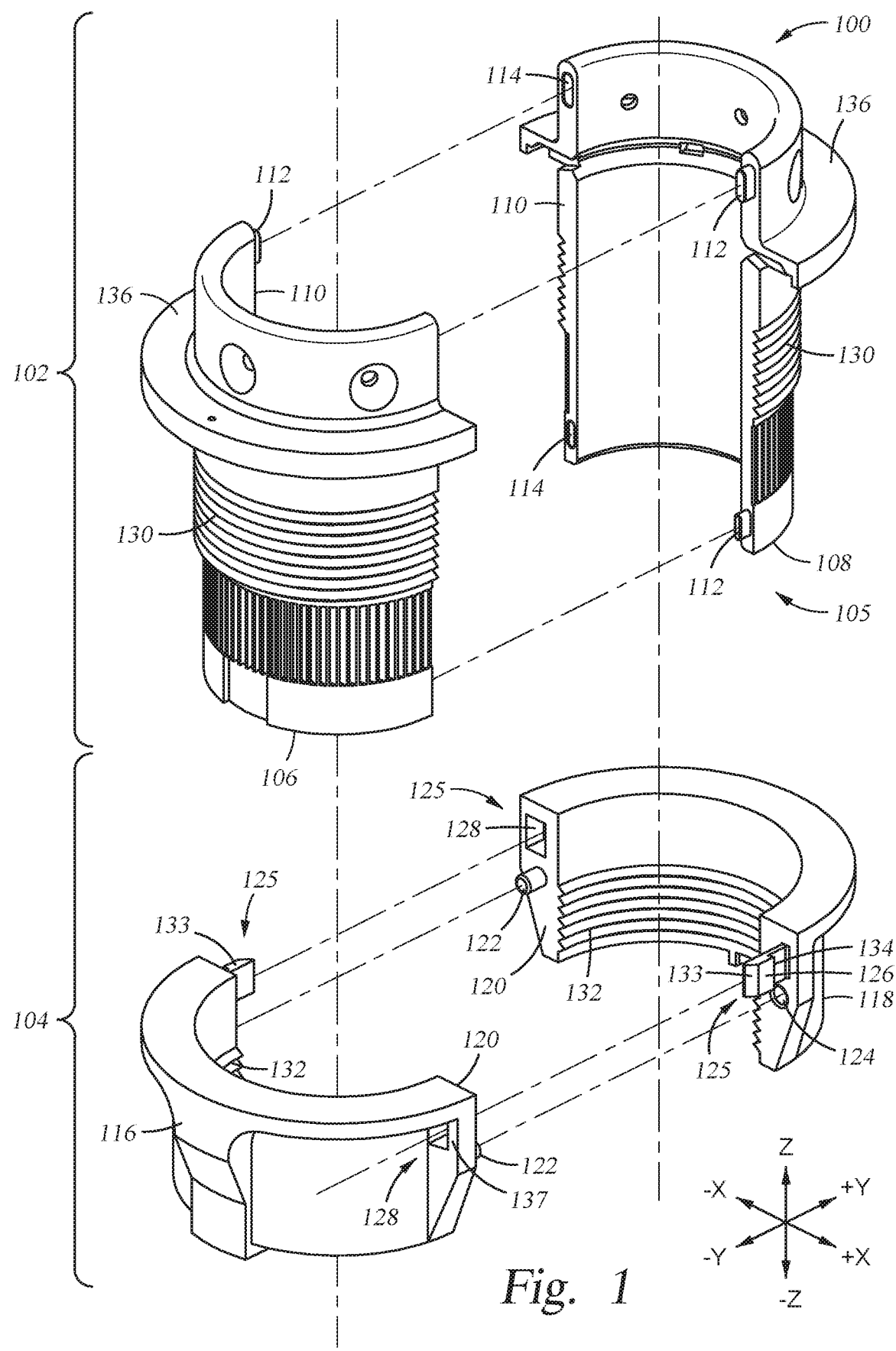
FIG. 1 is an exploded isometric view of a pass-through bulkhead seal fitting.

FIG. 1 is an exploded isometric view of a pass-through bulkhead seal fitting 100. The pass-through bulkhead seal fitting 100 includes a male fitting 102 and a multi-piece nut 104. The male fitting 102 includes a tubular multi-piece body 105 having multiple portions, shown as a first portion 106 and a second portion 108. Each of the first portion 106 and the second portion 108 may be halves of the multi-piece body 105. The first portion 106 and the second portion 108 are configured to mate at sides 110 thereof to form the male fitting 102 that may be inserted through a bulkhead or frame (e.g., a dividing wall or barrier between compartments in an aircraft, or other vehicle (not shown)). In some examples, the sides 110 may include indexing features, such as a protruding tab 112 that is received in a depression 114 when the first portion 106 and the second portion 108 are brought into proximity to each other. When the first portion 106 and the second portion 108 are separated as shown, the male fitting 102 may be disposed about existing wiring (not shown) without the need to disconnect and reconnect the wiring.

The multi-piece nut 104 also includes multiple portions, shown as a first portion 116 and a second portion 118. Each of the first portion 116 and the second portion 118 may be halves of the multi-piece nut 104. The first portion 116 and the second portion 118 are configured to mate at sides 120 thereof to form the multi-piece nut 104. In some examples, the sides 120 may include indexing features, such as a protruding tab 122 that is received in a depression 124 when the first portion 116 and the second portion 118 are brought into proximity to each other. When the first portion 116 and the second portion 118 are separated as shown, the multi-piece nut 104 may be disposed about existing wiring (not shown) without the need to disconnect and reconnect the wiring.

When the sides 120 of the first portion 116 and the second portion 118 are brought into contact with each other, the multi-piece nut 104 may be coupled to the male fitting 102 (when the sides 110 of the first portion 106 and the second portion 108 are brought into contact with each other).

In some examples, the multi-piece nut 104 includes one or more interlock or fastener devices 125, shown as a clip 126 that releasably mates with a retainer opening 128. Each of the one or more fastener devices 125 may be utilized to fix the first portion 116 and the second portion 118 to each other. The clips 126 are biased radially outward (in the X direction) such that the first portion 116 and the second portion 118 are fixed to each other and will not separate in a radial direction (in the Y direction). An angled land 133 may be provided on the clip 126 to facilitate insertion of the clip 126 into the retainer opening 128 when pressure is applied to the first portion 116 and the second portion 118 (in the Y direction). The fastener device 125 is more clearly shown in FIG. 5.

However, if the first portion 116 and the second portion 118 of the multi-piece nut 104 need to be separated, one or both of the clips 126 may be pushed inward (in the X direction) such that a shoulder 134 of the clips 126 (only one is shown on the second portion 118) clears an external wall 137 of the retainer opening 128 (only one is shown on the first portion 116). Once at least one of the shoulders 134 clears a respective wall 137, one of the first portion 116 or the second portion 118 opens with respect to each other similar to a clamshell allowing the multi-piece nut 104 to be removed from the male fitting 102. Alternatively, the first portion 116 (or the second portion 118) entirely separates from the second portion 118 (or the first portion 116) simultaneously or substantially simultaneously.

Both of the male fitting 102 and the multi-piece nut 104 includes threads, shown as threads 130 and threads 132, respectively. The threads 130 on the first portion 106 align with the threads 130 on the second portion 108 when the respective portions are in proximity with each other. Likewise, the threads 132 on the first portion 116 align with the threads 132 on the second portion 118 when the respective portions are in proximity with each other. Each of the first portion 106 and the second portion 108 of the male fitting 102 includes a radially extending flange 136 that may act as a stop against a bulkhead or frame (not shown).

Each of the male fitting 102 and the multi-piece nut 104 may be formed from the same or different materials which includes polymer materials, such as thermoplastic materials, for example, polyetherimide (PEI), polyetheretherketone (PEEK), or combinations thereof. The respective portions of the male fitting 102 and the multi-piece nut 104 may be machined, molded, extruded, formed by three dimensional printing techniques, or other suitable manufacturing method.

Figure 2A:
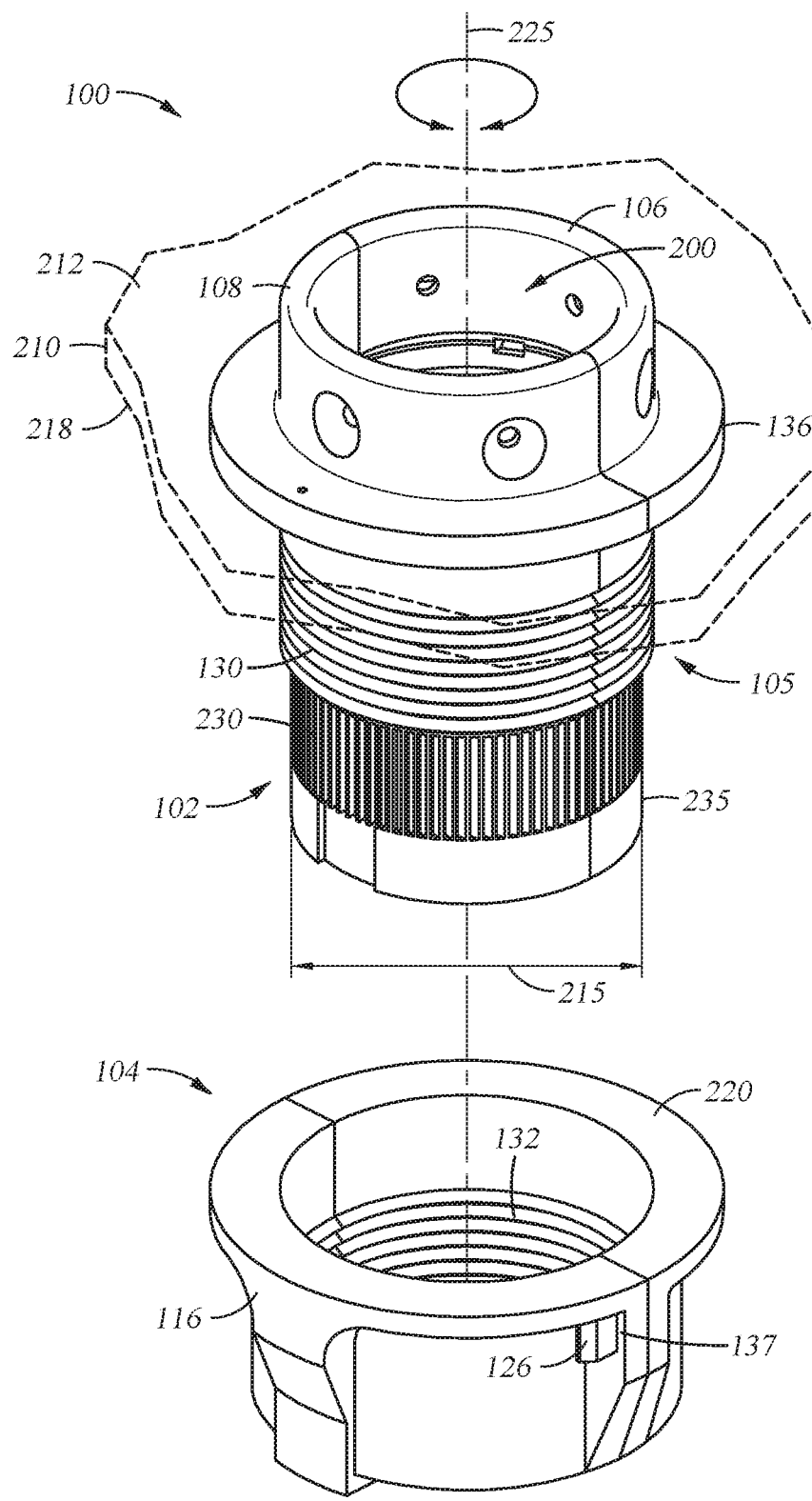
FIG. 2A is an isometric top view of the male fitting and the multi-piece nut of FIG. 1, each in an assembled state.
Figure 2B:
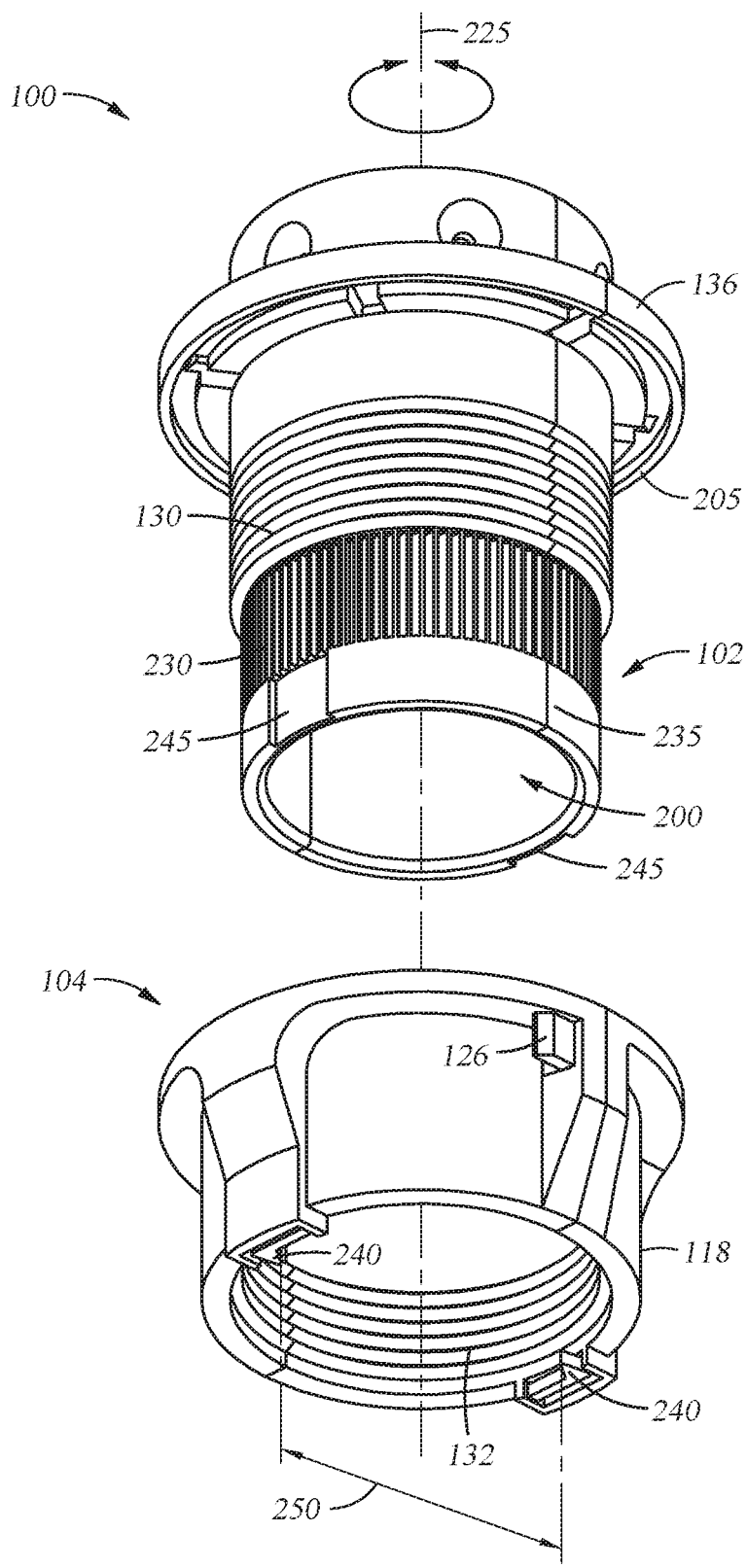
FIG. 2B is an isometric bottom view of the male fitting and the multi-piece nut of FIG. 1, each in an assembled state.

FIGS. 2A and 2B are isometric views of the pass-through bulkhead seal fitting 100 of FIG. 1 wherein the male fitting 102 and the multi-piece nut 104 are assembled (via bringing the respective portions of the male fitting 102 and the multi-piece nut 104 into contact). FIG. 2A is an isometric top view of the male fitting 102 and the multi-piece nut 104. FIG. 2B is an isometric bottom view of the male fitting 102 and the multi-piece nut 104.

When the portions of the male fitting 102 are assembled as shown, a volume 200 is formed within the male fitting 102 which may be used to house existing wiring (not shown). A surface 205 of the radially extending flange 136 (shown in FIG. 2B) is configured to contact portions of a first surface 212 of a barrier 210 (a portion is shown in FIG. 2A), which may be a bulkhead or frame. The barrier 210 includes an opening formed therethrough (not shown) which is sized to receive an outer diameter 215 of the male fitting 102. A surface 220 of the multi-piece nut 104 is adapted to contact an opposing surface 218 of the barrier 210 during installation. Installation includes rotating the male fitting 102 and the multi-piece nut 104 relative to each other about a longitudinal axis 225 of the pass-through bulkhead seal fitting 100.

The male fitting 102 also includes a plurality of ridges, such as raised features 230, disposed along an outer peripheral surface 235 of the first portion 116 and the second portion 118. In one example, the raised features 230 are oriented along the longitudinal axis 225. At least a portion of the raised features 230 interface with one or more detents 240 disposed on the multi-piece nut 104 (shown in FIG. 2A). The raised features 230 and the detents 240 comprise an anti-rotation feature (described in more detail below in FIG. 4). The detents 240 may be relatively inflexible and a recessed groove 245 may be formed in the outer peripheral surface 235 of the first portion 116 and the second portion 118 to facilitate passage of the detents 240 when the multi-piece nut 104 is positioned relative to the male fitting 102 along the longitudinal axis 225. The recessed grooves 245 may be utilized as a channel providing a space between outer surfaces of the recessed grooves 245 that is less than or equal to an inside dimension 250 of the detents 240 (shown in FIG. 2B). The space between the recessed grooves 245 is less than the outer diameter 215 of the male fitting 102 and, during coupling of the multi-piece nut 104 to the male fitting 102, the detents 240 may be aligned with the recessed grooves 245. The space provided between the recessed grooves 245 allows the multi-piece nut 104 to circumscribe the outer peripheral surface 235 of the first portion 116 and the second portion 118 with little or no contact between the detents 240 and the outer peripheral surface 235 of the first portion 116 and the second portion 118. However, when the threads 130 of the male fitting 102 interface with the threads 132 of the multi-piece nut 104, the detents 240 interact with the raised features 230 to provide rotation in a single direction and prevent rotation in a direction opposing the single direction. The single direction may depend on the direction of the threads 130, 132 but, in one example, the multi-piece nut 104 may be rotated clockwise relative to the male fitting 102 and counter-clockwise rotation is prevented by the detents 240 and the raised features 230.

Figure 3:
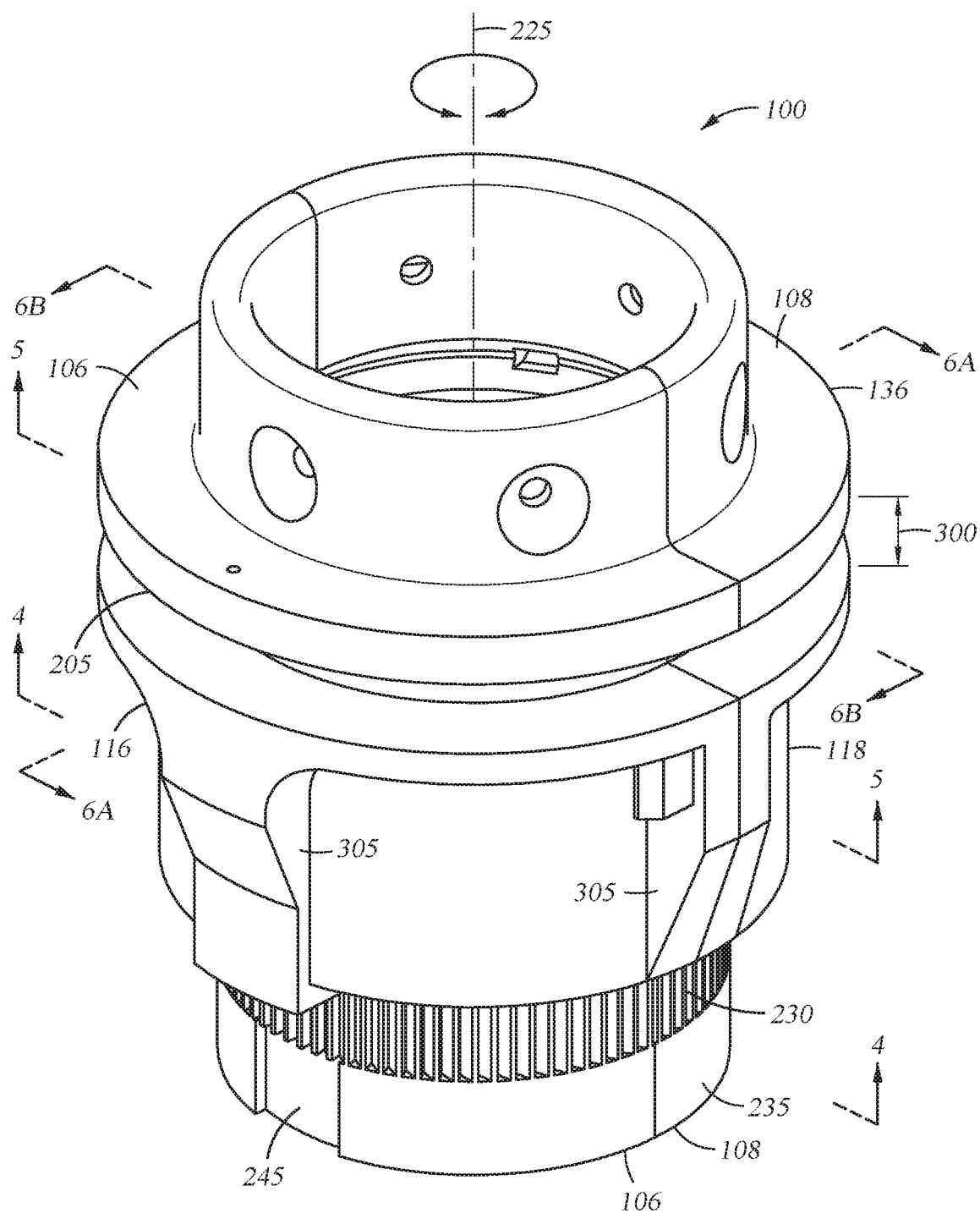
FIG. 3 is an isometric view of the pass-through bulkhead seal fitting fully assembled.

FIG. 3 is an isometric view of the pass-through bulkhead seal fitting 100 fully assembled. As shown, the multi-piece nut 104 is coupled to the male fitting 102 and a barrier (shown in FIG. 2A) may be disposed between the surface 205 of the radially extending flange 136 and the surface 220 of the multi-piece nut 104. The pass-through bulkhead seal fitting 100 as described herein provides an adjustable barrier space 300 formed between the surface 205 of the radially extending flange 136 and the surface 220 of the multi-piece nut 104. The adjustable barrier space 300 accommodates multiple barriers with different thicknesses allowing the pass-through bulkhead seal fitting 100 to be utilized with different bulkheads or frames. Further, the relative rotation between the male fitting 102 and the multi-piece nut 104 provides tightening against the barrier without the use of spacers or a specialized tool as is typical with conventional fittings. For example, the relative rotation of the male fitting 102 and the multi-piece nut 104 may be facilitated by hand without the use of other tooling. However, if additional torque is needed, one or more flats 305 are provided on the multi-piece nut 104 to facilitate use with a standard wrench.

Figure 4:
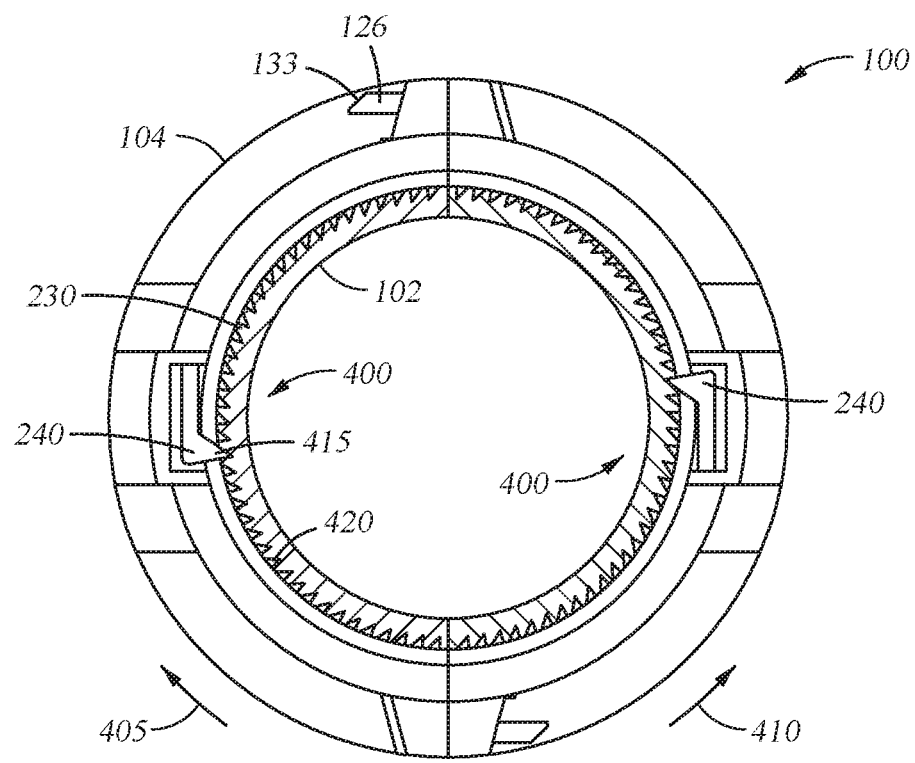
FIG. 4 is a cross-sectional view of the pass-through bulkhead seal fitting along lines 4-4 of FIG. 3.

FIG. 4 is a cross-sectional view of the pass-through bulkhead seal fitting 100 along lines 4-4 of FIG. 3. The detents 240 are shown interfacing with the raised features 230 to provide an anti-rotation feature 400. The anti-rotation feature 400 allows rotation of the multi-piece nut 104 in a first direction 405 while preventing rotation of the multi-piece nut 104 in a second direction 410. Alternatively, the anti-rotation feature 400 may allow rotation of the male fitting 102 in the second direction 410 while preventing rotation of the male fitting 102 in the first direction 405. The detents 240 may include a point 415 that interfaces with a depression 420 of the raised features 230. The depressions 420 may include an angle that allows the point 415 to advance in a single direction.

Figure 5:
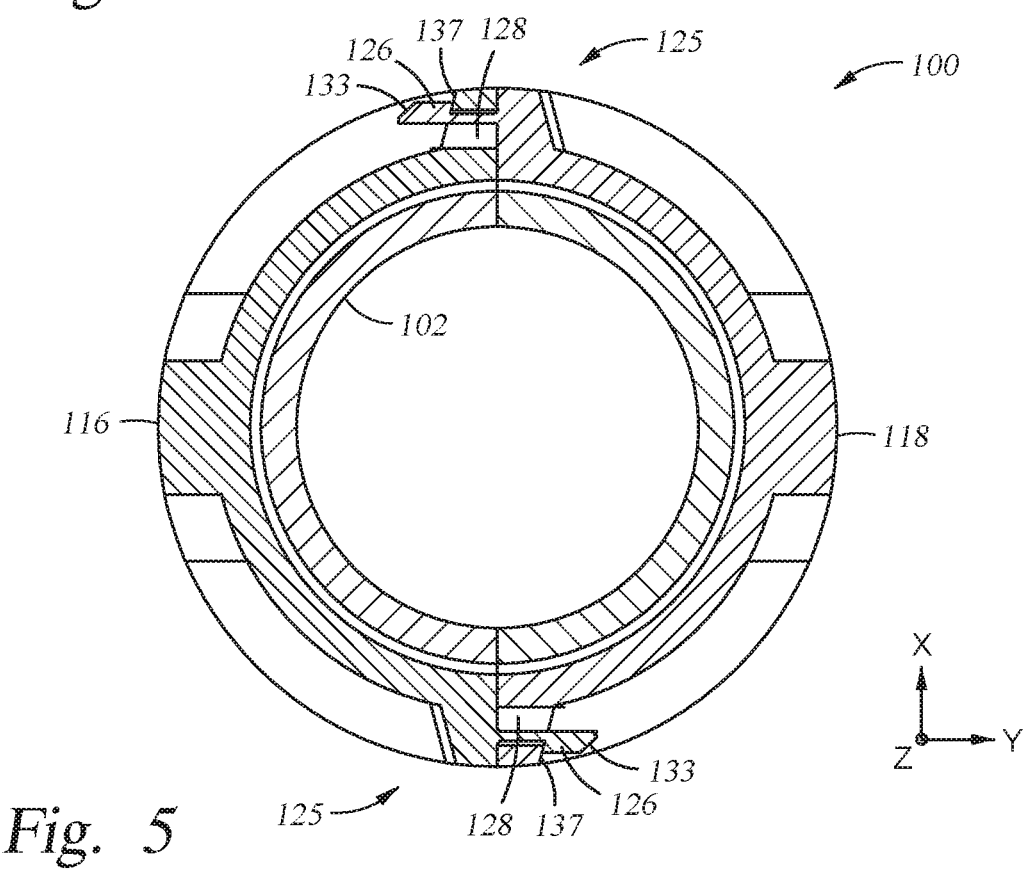
FIG. 5 is a cross-sectional view of the pass-through bulkhead seal fitting along lines 5-5 of FIG. 3.

FIG. 5 is a cross-sectional view of the pass-through bulkhead seal fitting 100 along lines 5-5 of FIG. 3 showing the fastener device 125 described in FIGS. 2A and 2B. The fastener devices 125 include the clips 126 and the retainer opening 128 which couple the first portion 116 and the second portion 118 together. However, if the first portion 116 and the second portion 118 need to be separated, one or both of the clips 126 may be pushed radially inward (in the X direction) by hand, and the shoulder 134 of the clips 126 clears the external wall 137 of the retainer opening 128 allowing one or both of the first portion 116 and the second portion 118 to move away from each other (with slightly less pressure on the clips 126 in the Y direction to push the clips 126 through the retainer openings 128).

Figure 6A:
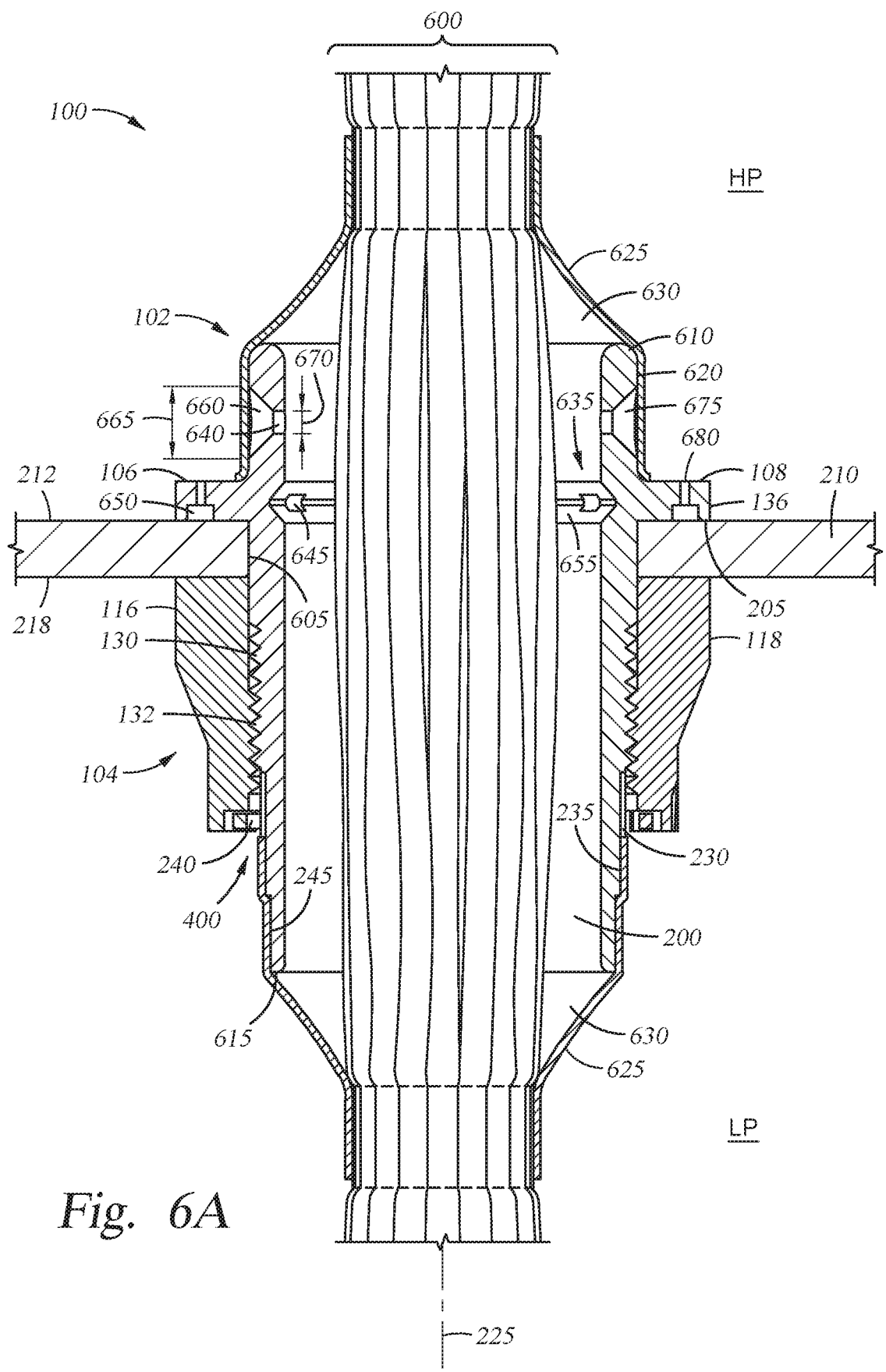
FIG. 6A and FIG. 6B are side cross-sectional views of the pass-through bulkhead seal fitting along lines 6A-6A and 6B-6B of FIG. 3, respectively, with the addition of existing wiring and a barrier.
Figure 6B:
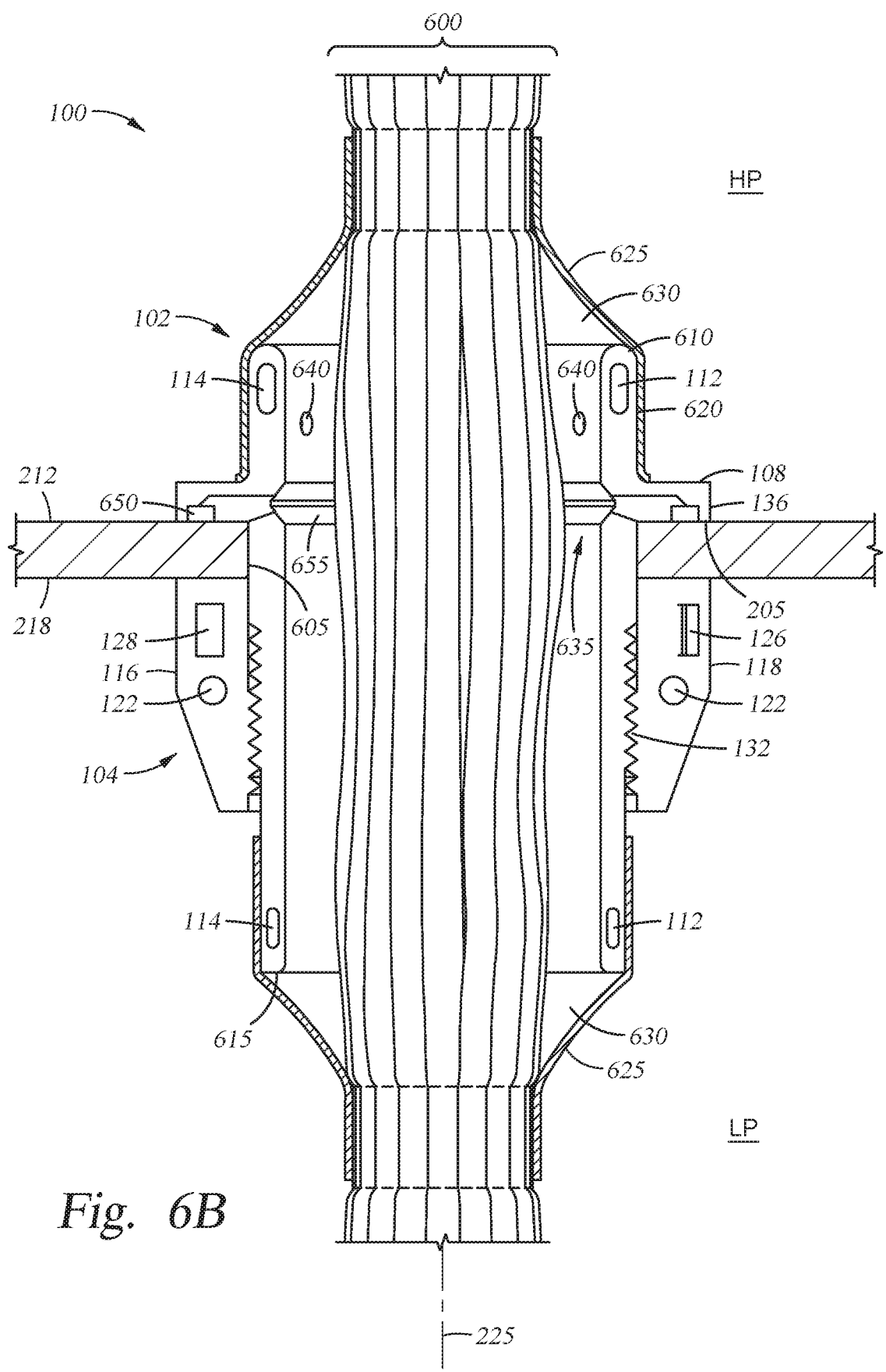

FIGS. 6A and 6B are side cross-sectional views of the pass-through bulkhead seal fitting 100 along lines 6A-6A and 6B-6B of FIG. 3, respectively, with the addition of existing wiring 600 and a barrier 210. The existing wiring 600 may be disposed through an opening 605 of the barrier 210. A first end 610 of the pass-through bulkhead seal fitting 100 may be disposed in a pressurized environment HP while a second end of the pass-through bulkhead seal fitting 100 may be disposed in a lower pressure environment LP.

To install the pass-through bulkhead seal fitting 100, the male fitting 102 may be separated into the first portion 106 and the second portion 108. The portions may then be positioned about the existing wiring 600 and inserted through the opening 605 of the barrier 210. The portions 106 and 108 may be placed in proximity about the existing wiring 600 to form the male fitting 102. Then, the multi-piece nut 104 that is separated into the first portion 116 and the second portion 118 may be positioned about the existing wiring 600. The first portion 116 and the second portion 118 may be joined by the fastener devices 125 about the existing wiring 600. The multi-piece nut 104 may be positioned where the detents 240 pass the outer peripheral surface 235 of the first portion 116 and the second portion 118 in the recessed grooves 245 and moved toward the radially extending flange 136 of the male fitting 102. Once the threads 130, 132 interface, one or both of the male fitting 102 and the multi-piece nut 104 may be rotated relative to each other to fix the pass-through bulkhead seal fitting 100 to the barrier 210. The rotation may be accomplished by hand to capture the barrier 210 between the male fitting 102 and the multi-piece nut 104. If additional torque is needed, the flats 305 (shown in FIG. 3) may be used. The anti-rotation feature 400 prevents the multi-piece nut 104 from backing-off the male fitting 102.

The pass-through bulkhead seal fitting 100 is also configured to receive a sealant for a complete pressure seal. The sealant application process will be described using FIGS. 6A, 6B and 7.

As described above, the male fitting 102 includes the outer peripheral surface 235 on the second end 615 thereof. Likewise, the first end 610 of the male fitting 102 includes an outer peripheral surface 620. The surfaces 235 and 620 may be utilized as a surface for applying an adhesive member or material, such as tape 625. The tape 625 may be disposed about the surfaces 235 and 620 as well as the existing wiring 600 to form a volume 630. The tape 625 may be used to bind the existing wiring 600 tightly at the first end 610 and the second end 615 of the male fitting 102. The volume 630 is formed by a boundary comprising interior surfaces of the tape 625, interior surfaces of the male fitting 102 and the bound wiring.

The male fitting 102 also includes a sealant distribution feature 635 that includes first openings 640 and second openings 645. The first openings 640 are in fluid communication with the volume 630 and the second openings 645 are in fluid communication with an annular channel 650 formed in the surface 205 of the radially extending flange 136. The second openings 645 may be formed in an annular depression 655 of the male fitting 102. The first openings 640 are formed in the outer peripheral surface 620 of the male fitting 102. The first openings 640 also include a flared opening 660 having an opening dimension 665 (which may be a diameter) that is greater than a dimension 670 (which may be a diameter) of the first opening 640. The flared opening 660 provides a volume 675 between interior surfaces thereof and the tape 625 that may be utilized as a gauge for determining the extent of sealant in the volume 630 as will be explained in greater detail in FIG. 7. While there are two flared openings 660 and two first openings 640 shown in FIG. 6A, the number of flared openings 660 and first openings 640 may be greater than two. The radially extending flange 136 also includes one or more third openings 680 that are in fluid communication with the annular channel 650. The third openings 680 may be utilized to determine the extent of sealant in the annular channel 650 as will be explained in greater detail in FIG. 7. While there are two third openings 680 shown in FIG. 6B, the number of third openings 680 may be greater than two.

Figure 7:
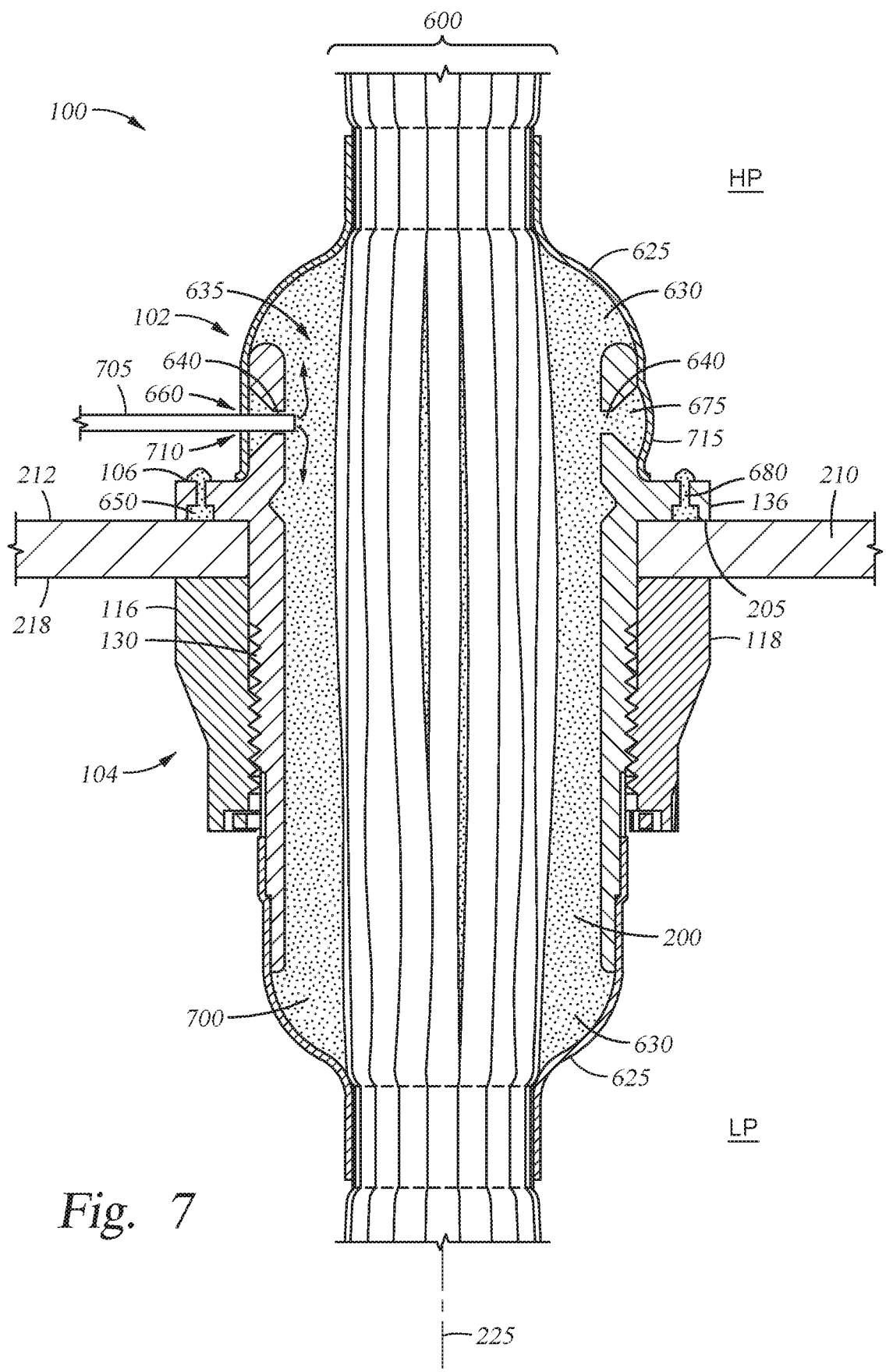
FIG. 7 is a side cross-sectional view of the pass-through bulkhead seal fitting similar to the view shown in FIG. 6A, with the addition of a sealant.

FIG. 7 is a side cross-sectional view of the pass-through bulkhead seal fitting 100 similar to the view shown in FIG. 6A, with the addition of a sealant 700. The sealant 700 may be a commercially available sealant typically used in the aircraft industry for pass-through fittings. The sealant 700 may be applied via a nozzle 705 to the volume 630 contained at least partially within the male fitting 102 and the tape 625. The sealant 700 may be applied as a liquid at a relatively low viscosity and may cure to a solid or near solid after application.

The sealant 700 may be applied through the nozzle 705 by piercing the tape 625 adjacent to one of the flared openings 660 to form an opening 710 that is in fluid communication with the volume 630. The sealant 700 should substantially fill the volume 630 including any spaces within or adjacent to the existing wiring 600. Additionally, the sealant 700 should be provided in the annular channel 650 to form a seal between the surface 205 of the radially extending flange 136 and the surface 212 of the barrier 210. The sealant 700 flows through the second openings 645 (hidden by the sealant 700 in FIG. 7 but shown in FIG. 6A) into the annular channel 650 in order to provide the sealant 700 to the annular channel 650.

To determine that the volume 630 is suitably filled with the sealant 700, bulges 715 (only one is shown in this view) are formed within the respective volumes 675 (only one is shown in this view). The bulges 715 may be slight protrusions in the tape 625 that extend radially outward and provide a visual indication of the level of sealant 700 within the volume 630. A portion of the first openings 640 not used to insert the nozzle 705 may be referred to as sealant exit ports that provide an indication of the sealant level within the volume 630. Additionally, the level of sealant 700 within the annular channel 650 may be determined when sealant 700 is within, or exits, the third openings 680 of the radially extending flange 136. The third openings 680 may be referred to as sealant exit ports. The sealant 700 may then harden after a few hours to provide a seal between at the opening in the barrier 210, which effectively seals the pressurized environment HP from the lower pressure environment LP. The sealant 700 that resides in the annular depression 655 (shown in FIGS. 6A and 6B) may further secure the pass-through bulkhead seal fitting 100 to the bound existing wiring 600 and thus prevent movement therebetween.

The pass-through bulkhead seal fitting 100 as described herein provides easier and quicker installation and removal as compared to conventional fittings. The pass-through bulkhead seal fitting 100 as described herein reduces parts from the conventional fittings (up to nine loose parts) to four parts (the first portion 106 and the second portion 108 of the male fitting 102, and the first portion 116 and the second portion 118 of the multi-piece nut 104). It is estimated that the install time for the pass-through bulkhead seal fitting 100 is reduced by about 4 minutes as compared to the conventional fitting install time. There are hundreds of these pass-through connections on a typical aircraft and several hours are saved using the pass-through bulkhead seal fitting 100 as described herein. Further, as the pass-through connections are numerous on an aircraft, the reduced part count saves weight. Additionally, the pass-through bulkhead seal fitting 100 requires no specialized tooling as is required on the conventional fittings.

What is claimed is:

1. A method for installing a pass-through bulkhead seal fitting, comprising:
   disposing a first portion of a male fitting around one or more wires;
   disposing a second portion of the male fitting around the one or more wires;
   joining the first portion of the male fitting to the second portion of the male fitting such that the one more wires run axially through the joined first portion of the male fitting and the second portion of the male fitting;
   disposing a first portion of a multi-piece nut around the one or more wires;
   disposing a second portion of a multi-piece nut around the one or more wires;
   joining the first portion of the multi-piece nut to the second portion of the multi-piece nut; and
   coupling the joined first portion of the multi-piece nut and the second portion of the multi-piece nut onto the joined first portion of the male fitting and the second portion of the male fitting, the coupling comprising rotating, in a first direction, the joined first portion of the multi-piece nut and the second portion of the multi-piece nut relative to the joined first portion of the male fitting and the second portion of the male fitting, wherein rotation of the joined first portion of the multi-piece nut and the second portion of the multi-piece nut is prevented in a second direction opposite the first direction.

2. The method of claim 1, further comprising inserting the joined first portion of the male fitting and the second portion of the male fitting through a hole in a bulkhead.

3. The method of claim 2, wherein the joined first portion of the male fitting and the second portion of the male fitting include a radially extending flange, and wherein the radially-extending flange is positioned on a first side of the bulkhead.

4. The method of claim 3, wherein the joined first portion of the multi-piece nut and the second portion of the multi-piece nut are positioned on a second side of the bulkhead.

5. The method of claim 4, wherein the coupling comprises contacting the first side of the bulkhead with the radially extending flange, and the contacting the second side of the bulkhead with the joined first portion of the multi-piece nut and the second portion of the multi-piece nut.

6. The method of claim 1, wherein the first portion of the male fitting and the second portion of the male fitting are joined along an axial length thereof.

7. The method of claim 1, further comprising disposing a sealant within the joined first portion of the male fitting and the second portion of the male fitting.

8. The method of claim 1, wherein joining the first portion of the male fitting to the second portion of the male fitting comprises aligning indexing features on the first portion of the male fitting to the second portion of the male fitting.

9. The method of claim 1, wherein joining the first portion of the multi-piece nut to the second portion of the multi-piece nut comprises engaging one or more interlocks of the first portion of the multi-piece nut to the second portion of the multi-piece nuts.

10. The method of claim 9, wherein the one or more interlocks comprise clips.

11. The method of claim 1, further comprising engaging a detent that is formed on the first portion of the multi-piece nut with a ridge formed on the first portion of the male fitting.

12. A method for installing a pass-through bulkhead seal fitting, comprising:
   disposing a first portion of a male fitting around one or more wires;
   disposing a second portion of the male fitting around the one or more wires;
   joining the first portion of the male fitting to the second portion of the male fitting such that the one more wires run axially through the joined first portion of the male fitting and the second portion of the male fitting;
   inserting the joined first portion of the male fitting and the second portion of the male fitting through an opening formed in a bulkhead;
   contacting the bulkhead with a radially extending flange of the joined first portion of the male fitting and the second portion of the male fitting;
   disposing a first portion of a multi-piece nut around the one or more wires;
   disposing a second portion of a multi-piece nut around the one or more wires;
   joining the first portion of the multi-piece nut to the second portion of the multi-piece nut by engaging a clip of the first portion of the multi-piece nut with a retainer opening of the second portion of the multi-piece nut;
   threading the joined first portion of the multi-piece nut and the second portion of the multi-piece nut onto the joined first portion of the male fitting and the second portion of the male fitting, the threading comprising rotating, in a first direction, the joined first portion of the multi-piece nut and the second portion of the multi-piece nut relative to the joined first portion of the male fitting and the second portion of the male fitting, wherein rotation of the joined first portion of the multi-piece nut and the second portion of the multi-piece nut is prevented in a second direction opposite the first direction; and securing the joined first portion of the male fitting and the second portion of the male fitting in the opening formed in the bulkhead.

13. The method of claim 12, wherein the radially-extending flange is positioned on a first side of the bulkhead.

14. The method of claim 13, wherein the joined first portion of the multi-piece nut and the second portion of the multi-piece nut are positioned on a second side of the bulkhead.

15. The method of claim 12, wherein the first portion of the male fitting and the second portion of the male fitting are joined along an axial length thereof.

16. The method of claim 12, wherein joining the first portion of the multi-piece nut to the second portion of the multi-piece nut comprises engaging one or more interlocks of the first portion of the multi-piece nut to the second portion of the multi-piece nuts.

17. The method of claim 16, wherein the one or more interlocks comprise clips.

18. A method for installing a pass-through bulkhead seal fitting, comprising:
- disposing a first portion of a male fitting around one or more wires;
- disposing a second portion of the male fitting around the one or more wires;
- joining the first portion of the male fitting to the second portion of the male fitting such that the one more wires run axially through the joined first portion of the male fitting and the second portion of the male fitting, the joining comprising aligning indexing features on the first portion of the male fitting to the second portion of the male fitting;
- inserting the joined first portion of the male fitting and the second portion of the male fitting through an opening formed in a bulkhead;
- disposing a first portion of a multi-piece nut around the one or more wires;
- disposing a second portion of a multi-piece nut around the one or more wires;
- joining the first portion of the multi-piece nut to the second portion of the multi-piece nut;
- threading the joined first portion of the multi-piece nut and the second portion of the multi-piece nut onto the joined first portion of the male fitting and the second portion of the male fitting, the threading comprising rotating, in a first direction, the joined first portion of the multi-piece nut and the second portion of the multi-piece nut relative to the joined first portion of the male fitting and the second portion of the male fitting, wherein rotation of the joined first portion of the multi-piece nut and the second portion of the multi-piece nut is prevented in a second direction opposite the first direction;
- securing the joined first portion of the male fitting and the second portion of the male fitting in the opening formed in the bulkhead;
- introducing a sealant into the joined first portion of the male fitting and the second portion of the male fitting while secured in the bulkhead.

19. The method of claim 18, wherein the first portion of the male fitting and the second portion of the male fitting are joined along an axial length thereof.

20. The method of claim 19, wherein rotation in the second direction is prevented by a plurality of axial ridges disposed on the joined first portion of the male fitting and the second portion of the male fitting.

* * * * *